US012812284B2

(12) United States Patent
Hjort et al.

(10) Patent No.: US 12,812,284 B2
(45) Date of Patent: Nov. 24, 2026

(54) HEARING PROTECTION DEVICE WITH HAPTIC FEEDBACK AND METHOD OF OPERATING A HEARING PROTECTION DEVICE

(71) Applicant: 3M INNOVATIVE PROPERTIES COMPANY, St. Paul, MN (US)

(72) Inventors: Patrick R.T. Hjort, Värnamo (SE); Jonas A. Nilsson, Värnamo (SE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 315 days.

(21) Appl. No.: 18/695,591

(22) PCT Filed: Sep. 16, 2022

(86) PCT No.: PCT/IB2022/058763
§ 371 (c)(1),
(2) Date: Mar. 26, 2024

(87) PCT Pub. No.: WO2023/052896
PCT Pub. Date: Apr. 6, 2023

(65) Prior Publication Data

US 2026/0136124 A1 May 14, 2026

(30) Foreign Application Priority Data

Sep. 30, 2021 (EP) .................................... 21200235

(51) Int. Cl.
*H04R 1/10* (2026.01)
*G06F 3/01* (2006.01)

(52) U.S. Cl.
CPC ........... *H04R 1/1041* (2013.01); *G06F 3/016* (2013.01); *H04R 1/1008* (2013.01); *H04R 1/1016* (2013.01); *H04R 1/1083* (2013.01)

(58) Field of Classification Search
CPC .. H04R 1/1041; H04R 1/1008; H04R 1/1016; H04R 3/005; G06F 3/016
See application file for complete search history.

(56) References Cited

U.S. PATENT DOCUMENTS 8,995,678 B2 3/2015 Demers et al.
9,351,075 B2 * 5/2016 Kunimoto ............ H04R 1/1008
(Continued)

FOREIGN PATENT DOCUMENTS

EP 3125574 B1 7/2020
WO 2016118398 A1 7/2016
(Continued)

OTHER PUBLICATIONS

Extended European Search Report received for EP Application No. 21200235.6, mailed on Mar. 14, 2022, 2 pages.
(Continued)

*Primary Examiner* — Angelica M Mckinney

(57) ABSTRACT

A hearing protection device (10, 10', 10") with at least one earmuff or earplug (12*a*, 12*b*, 12*a'*, 12*b'*, 12*a"*), optionally a headband (18, 18', 18") for supporting the earmuff or earplug (12*a*, 12*b*, 12*a'*, 12*b'*, 12*a"*) at the user's head, a control unit (42) and at least one haptic feedback element (44, 44*a*, 44*b*, 44*c*, 44*d*, 44*a'*, 44*b'*, 44*c'*, 44*d'*) comprising a skin-contacting element. The haptic feedback element (44, 44*a*, 44*b*, 44*c*, 44*d*, 44*a'*, 44*b'*, 44*c'*, 44*d'*) is configured and arranged to provide device-specific feed-back and ambience specific feedback to the user (100). The skin-12*a* contact element (46, 46*a*, 46*b*, 46*c*, 46*d*, 46*a'*, 46*b'*, 46*c'*, 46*d'*) is configured and arranged to transmit—in use—haptic signals to the user's skin Thus, the user (100) is provided with feedback not only about objects moving around the user (100), but also related to the hearing protection device (10, 10', 10") as such and conditions thereof. That is that such a hearing protection device (10, 10', 10") prevents or reduces
(Continued)

the risk of a collision of the wearer with other persons or objects in an easy and reliable way and at the same time, the user (100) of the hearing protection device (10, 10', 10") is reliably and easily informed about conditions of the hearing protection device (10, 10', 10"), e.g. battery warning, incoming calls or the like and/or conditions of the user (100). Also, the risk of missing relevant sounds is thereby compensated. Furthermore, a method of operating a hearing protection device (10, 10', 10") is provided, in which device-specific feedback and ambience-specific feedback to the user (100) of the hearing protection device (10, 10', 10") is provided.

16 Claims, 4 Drawing Sheets

(56) References Cited

U.S. PATENT DOCUMENTS

| | | | |
|---|---|---|---|
| 10,573,139 B2 | 2/2020 | Biggs | |
| 2015/0146893 A1 | 5/2015 | Kunimoto | |
| 2018/0288519 A1 | 10/2018 | Min | |
| 2020/0097084 A1* | 3/2020 | Ross | G06F 3/015 |
| 2020/0320834 A1* | 10/2020 | Marchais | G08B 7/00 |
| 2022/0264219 A1* | 8/2022 | Keikhosravy | H04R 3/005 |

FOREIGN PATENT DOCUMENTS

| | | |
|---|---|---|
| WO | 2017196231 A1 | 11/2017 |
| WO | 2019092607 A1 | 5/2019 |
| WO | 2021074651 A1 | 4/2021 |

OTHER PUBLICATIONS

International Search Report for PCT Application No. PCT/IB2022/058763, mailed on Jan. 3, 2023, 4 pages.

Randomfrankp, "Feel Your Games! Razer Nari Ultimate Headset First Impressions", 2018, URL: <https://www.youtube.com/watch?v=PT9y1gjvZ8s>, 3 pages.

Razer Hypersense, The Next Level of Gaming Immersion, URL: <https://www.razer.com/technology/razer-hypersense>, (date unknown but believed to be prior to the date of the filing of the present application), 9 pages.

* cited by examiner

HEARING PROTECTION DEVICE WITH HAPTIC FEEDBACK AND METHOD OF OPERATING A HEARING PROTECTION DEVICE

CROSS REFERENCE TO RELATED APPLICATIONS

This application is a national stage filing under 35 U.S.C. 371 of PCT/IB2022/058763, filed Sep. 16, 2022, which claims the benefit of EP Application Serial No. 21200235.6, filed Sep. 30, 2021, the disclosure of which is incorporated by reference in its/their entirety herein.

TECHNICAL FIELD

The present disclosure relates to a hearing protection device with haptic feedback and to a method of operating a hearing protection device.

SUMMARY OF THE INVENTION

Hearing protectors as personal protection equipment (PPE) are typically used in noisy environments for protecting a wearer's hearing from noise at potentially harmful noise levels. Typically, hearing protection devices have two earmuffs or cups which cover the ears of the wearer and which are connected to one another by a headband. Each cup further typically is formed by a rigid outer shell that is furnished with a noise dampening material, for example a porous or foamed material. Alternatively, hearing protection devices may comprise earplugs instead of earmuffs, which typically fit into the ear canal of the wearer or user.

There is a general desire to make hearing protection devices sufficient for persons that are in noisy environments for longer times. While noise dampening is the essential purpose of a hearing protection device, there is often a need for the wearer to hear certain sounds from the environment, like acoustic signals from other persons or objects in order to be aware of persons or objects moving towards the wearer of a hearing protection device. In addition to that, it may be beneficial for the user of such a hearing protection device to receive acoustic signals about the hearing protection device. These acoustic signals may include, for example, alarm sounds relative to moving objects in the surrounding such as vehicles, signals on the status of the hearing protection device including, for example, conditions of the battery.

Although there are active hearing protection devices on the market which have active or passive noise dampening properties and additionally are configured to transmit sounds from the environment into the earmuff or earplug via active electronics connected to a microphone outside the ear cup and a loudspeaker inside the earmuff or earplug, there might be the risk that such acoustic signals are not transmitted into the earmuff or earplug or that such acoustic signals may be missed because of a plurality of acoustic input. This may lead to dangerous situations for the wearer.

Although existing hearing protection devices may compensate the risk of missing acoustic signals by providing haptic feedback about moving objects, however, none of these solutions is simultaneously related to the aspect of providing other feedback, for example about the conditions of the hearing protection device.

Therefore, a need exists to provide a hearing protection device addressing the aforementioned issues with providing feedback to the user of a hearing protection device. It is therefore an object of the present disclosure to improve the feedback to the user of a hearing protection device.

In a first aspect, the present disclosure relates to a hearing protection device comprising at least one earmuff or earplug, optionally a headband for supporting the earmuff or the earplug at the user's head. The at least one earmuff or earplug comprises sound-absorbing material. The hearing protection device comprises a control unit and at least one haptic feedback element comprising a skin-contact element. The haptic feedback element is configured and arranged to provide device-specific feedback and ambience-specific feedback to the user. The skin-contact element is configured and arranged to transmit—in use—haptic signals to the user's skin. Preferably, the skin-contact element is arranged at a side of the earmuff or earplug facing—in use—towards the user's skin. The skin-contact element preferably contacts the user's skin. Configuring and arranging the haptic feedback element includes providing means for generating haptic feedback, e.g. a vibration motor or comparable means as described in more detail below as well as mounting the haptic feedback element at the hearing protection device such that the skin-contact element of the haptic feedback element reaches the user's skin for contact. Configuring and arranging the skin-contact element includes providing means to transmit haptic signals to the user's skin, e.g. a contact surface of a vibration motor or of another part of the hearing protection device contacting the user's skin. It is understood by the skilled person that the skin-contact element may contact the user's skin constantly, i.e. even when no haptic signal is transmitted to the user's skin or may be brought into contact upon transmission of such haptic signals. The advantage of a hearing protection device with such a haptic feedback element is that haptic feedback is provided to the user of the hearing protection device not only about moving objects or other conditions around the user, but also related to the hearing protection device as such and conditions thereof and/or conditions of the user. That is that such a hearing protection device prevents or minimizes the risk of a collision of the wearer with other persons or objects by ambience-specific feedback of the haptic feedback element in an easy and reliable way. At the same time, the user of the hearing protection device is reliably and easily informed by the device-specific feedback of the haptic feedback element about conditions of the hearing protection device, e.g. battery warning, incoming calls or the like and/or conditions of the user. In particular, the risk of missing relevant sound is thereby compensated or minimized.

In a second aspect, the present disclosure relates to a method of operating a hearing protection device. The hearing protection device comprises at least one earmuff or earplug, optionally a headband for supporting the earmuff or earplug at the user's head. The at least one earmuff or earplug comprises sound-absorbing material. The hearing protection device comprises a control unit and at least one haptic feedback element comprising a skin-contact element. The haptic feedback element is configured and arranged to provide device-specific feedback and ambience-specific feedback to the user, wherein the skin-contact element is configured and arranged to transmit—in use—haptic signals to the user's skin. Preferably, the skin-contact element is arranged at a side of the earmuff or earplug facing—in use—towards the user's skin. The skin-contact element preferably contacts the user's skin. The method comprises the steps of: detecting conditions of the hearing protection device and/or of the user; detecting conditions of the ambience of the hearing protection device; processing the detected conditions and forming device-specific feedback and ambience-specific feedback signal; providing device-specific feedback and ambience-specific feedback to the user of the hearing protection device by transmitting haptic signals to the user's skin. Configuring and arranging the skin-contact element includes providing means to transmit haptic signals to the user's skin, e.g. a contact surface of a vibration motor or of another part of the hearing protection device contacting the user's skin. It is understood by the skilled person that the skin-contact element may contact the user's skin constantly, i.e. even when no haptic signal is transmitted to the user's skin, or may be brought into contact upon transmission of such haptic signals. The advantage of a hearing protection device with such a haptic feedback element is that haptic feedback is provided to the user of the hearing protection device not only about moving objects or other conditions around the user, but also related to the hearing protection device as such and conditions thereof and/or conditions of the user. That is that such method of operating a hearing protection device prevents or minimizes the risk of a collision of the wearer with other persons or objects by ambience-specific feedback of the haptic feedback element in an easy and reliable way. At the same time, the user of the hearing protection device is reliably and easily informed by the device-specific feedback of the haptic feedback element about conditions of the hearing protection device, e.g. battery warning, incoming calls or the like and/or conditions of the user. In particular, the risk of missing relevant sounds is thereby compensated or minimized.

A hearing protection device (HPD) within the meaning of the present disclosure is a personal protective equipment that comprises an ear protection worn in or over the ears while being exposed to hazardous or irritating ambient sounds or noise. An HPD helps to prevent noise-induced hearing impairment or even loss. HPD's may typically comprise two earmuffs or earplugs, although HPD's with one earmuff or earplug are conceivable. To achieve the protection, HPD's typically comprise active and/or passive noise reduction of cancellation means as described above. HPD's may also comprise a headband for connecting the two earmuffs or ear plugs and to keep these in position when the HPD is worn by a worker or user. The earmuffs of the HPD may be provided in the shape of a cup. Each cup further typically is formed by a rigid shell that is furnished with a noise dampening material, for example a foamed material. Each cup has an ear-facing or skin-facing side, which—in use—faces towards the ear or skin of a user and a closed side, which faces—in use—away from the user's ear or skin. Alternatively, the hearing protection device may comprise earplugs having an ear-facing or skin-facing side, which—in use—faces towards the ear or skin of a user and a closed side, which faces—in use—away from the user's ear or skin. Earmuffs or earplugs typically comprise a cushion contacting the ear or skin of a user. Typically, materials for the cushion comprise a porous or foamed material. Materials suitable for providing acoustic damping or noise-damping may include porous or foamed materials and may include an EPDM (ethylene propylene diene monomer rubber) foam or PU (Polyurethane). The foamed material may include open pored or closed pored materials. Alternatively, the materials comprise a non-porous or foam-free material, e.g. silicone material of a theoretical density of between 1.1 g/cm$^3$ and 1.2 g/cm$^3$. Cushions of earmuffs may be provided as on-ear or over-ear cushions. The material and the structure of the cushion typically provides for resilient properties, in particular to allow an over-ear cushion to adapt tightly and sealingly with a user's or wearer's skin. It is also conceivable to include rubber as material for the cushion. The cushion may be cut-off or molded to achieve the desired size and shape.

Active or passive noise reduction or cancellation within the meaning of the present disclosure is understood as measures in a headset that reduces unwanted ambient sound impact to the ears of a user. This may be achieved by passive measures, e.g. where the outer shells or cups and cushions of the headset comprise damping material and wherein the cushions cover the user's ears. In case of earplugs, sound absorption material may be placed on or in the user's ear canal. Alternatively or in addition to passive noise reduction or cancellation, active noise reduction or cancellation uses a technology where the ambient sound is captured by a microphone and inverted sounds waves, i.e. sound waves being exactly out of phase, are being generated and played via loudspeakers in the headset to the user in parallel to the ambient noise reaching the user's ears. Typically, these opposite sounds waves collide and eliminate each other or cancel each other.

Sensors suitable for the hearing protector according to the present disclosure comprise cushion sensors for sensing conditions of the cushion and/or of the skin contacted by the cushion, cup sensors for sensing conditions of the cup, skin sensors for sensing skin conditions of a user or wearer, physiological sensors for sensing physiological parameters of a user or wearer, environmental sensors for sensing environmental or ambient conditions of the surrounding of a user or wearer and/or movement sensors for sensing a movement of a user or wearer. Sensors may also include a proximity sensor or detector which is configured and arranged to detect the presence of an object in the surrounding of the user or wearer.

Haptic feedback to a user of a hearing protection device is understood as feedback to the user provided by the haptic feedback element. Haptic technology is also known as kinaesthetic communication or 3D touch. Haptic feedback includes the application of forces, vibrations, movements or other skin-contacting actions to the user's skin. Other skin-contacting actions may e.g. include a piston moving and poking onto or touching the user's skin. Such skin-contacting action, in particular vibrations, may be provided by a motor, an electromagnetic inducer or a piezoelectric element as the haptic feedback element. Haptic feedback may also be provided in the form of heat or cold applied to the user's skin, i.e. the haptic feedback element may include a heat or cold tempered surface in that case. The aforementioned skin-contacting actions are considered as haptic signals applied to the user's skin. As explained above, haptic signals may include forces, vibrations, movements, heat and/or cold. A haptic feedback element comprises a skin-contacting element for contacting the user's skin, preferably the skin of or around the user's ear. The skin-contact element may be arranged at a side of the earmuff or earplug facing—in use—towards the user's skin and such that it touches—in use—the user's skin. The skin-contact element may also be arranged at other parts of the hearing protection device, e.g. the cushion or the headband. It is also conceivable that the skin-contact element initially does not touch the user's skin but is moved upon application of a haptic signal to the skin such that it then touches the skin. It is noted that—in addition to the haptic feedback to the user—the hearing protection device may give other feedback to the user, e.g. an acoustic or optical feedback such that a sound is played to the user for certain aspects of the feedback. Such acoustic or optical feedback as such is not considered as haptic feedback.

Device-specific feedback typically includes conditions of the hearing protection device comprising motion, orientation, battery capacity, operational capability of the hearing protection device as well as user conditions such as skin temperature of a user, skin resistance of a user. In other words, the device-specific feedback includes direct conditions of the hearing protection device as well as indirect conditions such as user conditions as mentioned above as these are typically detected or sensed by the hearing protection device. Specific sensors may be arranged to provide the required data as mentioned above, e.g. measuring sensors to measure the skin properties or to measure conditions of the hearing protection device such as battery status etc. Also, detecting the orientation and movement of the hearing protection device and the user, respectively, is understood to be included here as well as incoming communication, e.g. incoming call of an active communication unit included in the hearing protection device, status of an active noise cancelling unit and so on.

Ambience-specific feedback typically includes ambient temperature, ambient pressure, a warning/an indication about objects moving around the user or about specific situations in the surrounding of the user. This may include the distance, spatial position and movement of an object in the surrounding. The specific situations in the surrounding of the user may include fire alarms, noise level or the like detected by and/or transferred to the hearing protection device. Specific sensors may be configured and arranged to detect the required conditions. The ambience-specific feedback for a moving object may be such that the haptic feedback is adapted to the spatial position and movement of an object. For example, if a vehicle in front of the user moves from the left to the right, the haptic feedback elements with their skin-contact elements will transmit haptic feedback to the user's skin in a similar pattern, i.e. start a vibration on the most left oriented haptic feedback element and successively move to the most right haptic feedback element. It is understood that such a haptic feedback about a moving object may require arranging a plurality of haptic feedback elements and skin-contact elements, respectively, in both earmuffs or earplugs in order to vary the position of haptic signals transmitted to the user's skin. Such ambience specific feedback may also include to vary the intensity of the haptic feedback and haptic signals accordingly, i.e. start with high intensity on the most left haptic feedback element and move with a high intensity to the most right haptic feedback element. This may require arranging haptic feedback elements not only on the most left and right position, but also in intermediate positions. For example, the hearing protection device may comprise a plurality of haptic feedback elements in each of the earmuffs or earplugs with a different position such as on a top and bottom position as well as on a front and rear position of the earmuff or earplug. Ambience-specific feedback may also include communication of the hearing protection device to an external device or component such as a sensor. Ambient noise or sound as such is not considered as haptic feedback.

In one embodiment, the at least one earmuff or earplug of the hearing protection device comprises a cushion at a side facing—in use—towards the user's skin and an outer shell at a side facing—in use—away from the user's skin. Such a cushion is beneficial as it helps to provide a seal between the earmuff or earplug of the hearing protection device and the user's skin, which may—in particular—be useful when sound-absorption or noise-cancellation of the hearing protection device is required, so that leakages are avoided or minimized. Such an outer shell is beneficial as it provides for stability of the earmuff or earplug. Also, as the outer shell typically has a semi-spherical shape, space is provided for accommodating parts of a hearing protection device, e.g. electronic components, loudspeakers etc.

In a certain embodiment, where the earmuff or earplug comprises a cushion and an outer shell, the skin-contact element is arranged at the cushion. Such an arrangement is useful as the cushion typically provides good contact to the user's skin and reliable contact of the skin-contact element to the skin is provided thereby.

In another embodiment, where the earmuff or earplug comprises a cushion and an outer shell, the skin contact element extends from the at least one earmuff or earplug, preferably from the outer shell. Such an arrangement is beneficial as the outer shell typically has reasonable rigidity or stability and provides for the reliable mounting of the skin-contact element thereby. Also, other skin-contact locations may be achieved thereby, i.e. not directly at or around the user's ear, but e.g. at the cheek of the user. Such an arrangement is beneficial as the earmuff or earplug of the hearing protection device may easily be retrofitted with a haptic feedback element and a skin-contact element, respectively, and no change of the cushion may be needed. It is conceivable that the hearing protection device has more than one haptic feedback element and skin-contact element, respectively, e.g. a skin-contact element at a cushion and a skin-contact element at the outer shell. Such an arrangement may be beneficial as two (or more) skin-contact elements may provide for more reliable transmission of the haptic signals to the user's skin. Also, the arrangement at different positions may allow for splitting the transmission such that certain signals, e.g. signals of the device-specific feedback, are transmitted through one skin-contact element, whereas other signals, e.g. signals of the ambience-specific feedback, are transmitted through the other skin-contact element.

In one embodiment, the device-specific feedback of the hearing protection device includes conditions of the hearing protection device and/or of the user comprising motion, orientation, skin temperature of a user, skin resistance of a user, battery capacity, operational capability of the hearing protection device. Such device-specific feedback may also include, for example, feedback for switching radio channels, when reaching minimum or maximum volume and/or when sound-leakage occurs. The latter may require arranging microphones for detecting the noise level outside of the earmuff or earplug and inside of the earmuff or earplug, i.e. within the ear canal of the user. Device-specific feedback may also include notification about an incoming call of an active communication unit present at the hearing protection device. The advantage of such a device-specific feedback is that the user is being provided with sufficient information about the hearing protection device and/or about conditions of the user.

In another embodiment, the ambience-specific feedback of the hearing protection device includes ambient temperature, ambient pressure, a warning or indication about objects moving around the user and/or specific situations in the surrounding of the user and wherein the ambience-specific feedback includes information or signals from a remote device, preferably comprising a sensor. The specific situations in the surrounding of the user may include fire alarms, noise level or the like. The advantage of such an ambient-specific feedback is that the user is being provided with sufficient information about the surrounding of the user of the hearing protection device. The advantage of a hearing protector with such an ambience-specific feedback is further that information from external devices will be provided to the user of the hearing protection device, which may include alarms about possible collision or other critical situations in a working environment, e.g. a fire alarm or the like. Information from external sensors may be taken into account, which increases the feedback provided to the user.

In a further embodiment, the hearing protection device comprises a proximity detector wherein the control unit is connected to the proximity detector and to the haptic feedback element. The advantage of such a proximity detector is that objects in the surrounding of the user of the hearing protection device can easily and reliably be detected.

In a certain embodiment, where the hearing protection device comprises a proximity detector, the proximity detector of the hearing protection device is configured and arranged to detect the physical presence of an object surrounding the hearing protection device and to provide a proximity signal to the control unit. The advantage of such a proximity detector is that objects in the surrounding of the user of the hearing protection device can easily and reliably be detected and that information about such an object is provided to the control unit of the hearing protector.

In a further embodiment, the control unit of the hearing protection device is configured to switch parameters at the hearing protection device and to detect conditions of the hearing protection device and/or of the user. Such a control unit is advantageous as the control unit can directly switch and adapt the hearing protection device based on detected conditions of the hearing protection device.

In yet a further embodiment, the control unit of the hearing protection device is configured to send a control signal to the at least one haptic feedback element. Such a control signal may be based on the detected conditions or input signals. The advantage of such a control unit is that the haptic feedback element is controlled by the control unit thereby allowing for conversion of different input by the control unit into a standard signal sent to the haptic feedback element.

In still a further embodiment, the hearing protection device comprises a proximity detector, wherein the proximity detector comprises a transmitter for sending out a detection signal and at least one receiver for receiving the returned detection signal. The advantage of such a detector is that an easy and reliable way of detecting objects surrounding the hearing protection device is provided thereby.

In another embodiment, the at least one haptic feedback element of the hearing protection device is configured and arranged to receive a control signal from the control unit to provide haptic signals to the user. The advantage of such a control signal to the haptic feedback element is that an easy and reliable way of initiating the feedback to the user is provided thereby.

In yet another embodiment, the control unit of the hearing protection device comprises at least one sensor to detect environmental and/or physiological conditions, preferably an accelerometer, a temperature sensor, a humidity sensor, an acoustic sensor and/or pressure sensor. Other sensors are conceivable, e.g. an UV sensor, a sunburn sensor, vital sensors for measuring blood pressure or electrocardiogram (ECG), sensors to detect moving objects such as radar, GPS or the like. Such a control unit is beneficial in that a simple and reliable construction is provided with a sensor integrated into the control unit.

In still another embodiment, the haptic feedback element of the hearing protection device comprises a vibration device wherein the haptic signal includes vibration. Other devices are conceivable as part of the haptic feedback element, e.g. a motor, electromagnetic inducers, piezoelectric elements and/or small piston driven by a solenoid poking on user's skin. Alternatively or in addition to the aforementioned devices, other devices are conceivable as part of the haptic feedback element, e.g. for the application of heat or cold. Such a haptic feedback element is beneficial as it represents an easy and reliable way of providing haptic feedback to the user of the hearing protection device.

In still a further embodiment, the at least one earmuff or earplug of the hearing protection device comprises a plurality of haptic feedback elements configured and arranged at the at least one earmuff or earplug such that localization information about a moving object is provided to the user. Such localization information may be based on the detection of a moving object, e.g. by a proximity detector. The localization information may include information about the spatial position and about the movement of a moving object. For example, if a vehicle moves from the left to the right, the haptic feedback elements with their skin-contact elements will provide haptic feedback in a similar pattern, i.e. start the haptic signals on the left and move towards the right. Such an arrangement is beneficial as the user is provided with detailed feedback about the presence and the movement of an object in the surrounding of the user of the hearing protection device including a spatial information about that object.

In certain embodiments, where a plurality of haptic feedback elements is present, different haptic signals are provided by each of the haptic feedback elements. For example, a haptic feedback element located at an upper portion of the earmuff or earplug may provide for device-specific feedback, whereas a haptic feedback element located at a lower position of the earmuff or earplug may provide for ambience-specific feedback. It is also conceivable that the upper and lower haptic feedback element both provide device-specific and ambience-specific feedback, but different haptic signals of the respective haptic feedback.

In yet a certain further embodiment, where the at least one earmuff or earplug comprises a cushion arranged at a side facing—in use—towards the user's skin, the cushion of the hearing protection device comprises four haptic feedback elements, wherein two haptic elements are arranged opposite to each other on an upper and lower part of the cushion and wherein two haptic feedback elements are arranged opposite to each other in a front and rear part of the cushion. With such an arrangement, sufficient spatial information is provided to the user of the hearing protection device about an object in the surrounding of the user.

In another embodiment, the hearing protection device further comprises an active communication unit comprising a receiver with a loudspeaker, preferably a transmitter with a microphone, wherein the device-specific feedback includes incoming messages or calls. The advantage of such an active communication unit is that the user of the hearing protection device is enabled to communicate with others, in particular over a certain distance, and to exchange voice communication.

In a further embodiment, in the method of operating a hearing protection device, the device-specific feedback of the hearing protection device includes conditions of the hearing protection device and/or of the user comprising motion, orientation, skin temperature of a user, skin resistance of a user, battery capacity and/or operational capability of the hearing protection device. Such device-specific feedback may also include, for example, feedback for switching radio channels, when reaching minimum or maximum volume and/or when sound-leakage occurs. The latter may require arranging microphones for detecting the noise level outside of the earmuff or earplug and inside of the earmuff or earplug, i.e. within the ear canal of the user. The advantage of such a device-specific feedback is that the user is being provided with sufficient information about the hearing protection device and/or about conditions of the user.

In yet a further embodiment, in the method of operating a hearing protection device, the ambience-specific feedback of the hearing protection device includes ambient temperature, ambient pressure, a warning or indication about objects moving around the user and/or specific situations in the surrounding of the user wherein the ambient-specific feedback optionally includes information or signals from a remote device, preferably comprising a sensor. The specific situations in the surrounding of the user may include fire alarms, noise level or the like. The advantage of such a device-specific feedback is that the user is being provided with sufficient information about the surrounding of the user of the hearing protection device. The advantage of a hearing protector with such an ambience-specific feedback is further that information from external devices will be provided to the user of the hearing protection device, which may include alarms about possible collision or other critical situations in a working environment, e.g. a fire alarm or the like. Information from external sensors may be taken into account, which increases the feedback provided to the user.

In still a further embodiment, in the method of operating a hearing protection device, the hearing protection device comprises a proximity detector wherein the control unit is connected to the proximity detector and to the haptic feedback element. The advantage of such a proximity detector is that objects in the surrounding of the user of the hearing protection device can easily and reliably be detected.

In a certain embodiment, in the method of operating a hearing protection device, where the hearing protection device comprises a proximity detector, the proximity detector of the hearing protection device is configured and arranged to detect the physical presence of an object surrounding the hearing protection device and to provide a proximity signal to the control unit. The advantage of such a proximity detector is that objects in the surrounding of the user of the hearing protection device can easily and reliably be detected and that information about such an object is provided to the control unit of the hearing protector.

In yet another embodiment, in the method of operating a hearing protection device, the control unit of the hearing protection device is configured to switch parameters at the hearing protection device and to detect conditions of the hearing protection device. Such a control unit is advantageous as the control unit can directly switch and adapt the hearing protection device based on detected conditions of the hearing protection device.

In still another embodiment, in the method of operating a hearing protection device, the control unit of the hearing protection device is configured to send a control signal to the at least one haptic feedback element. Such a control signal may be based on the detected conditions or input signals. The advantage of such a control unit is the haptic feedback element is controlled by the control unit thereby allowing for conversion of different input by the control unit into a standard signal sent to the haptic feedback element.

In a further embodiment, in the method of operating a hearing protection device, the at least one haptic feedback element of the hearing protection device is configured and arranged to receive a control signal from the control unit to provide haptic signals to the user. The advantage of such a control signal to the haptic feedback element is that an easy and reliable way of initiating the feedback to the user is provided thereby.

The invention was described in various embodiments above. It is understood by a person skilled in the art, that one of, several of or all the above-mentioned embodiments can be combined with each other.

The invention will now be described in more detail with reference to the following Figures exemplifying particular embodiments of the invention:

DETAILED DESCRIPTION OF THE FIGURES

Figure 1:
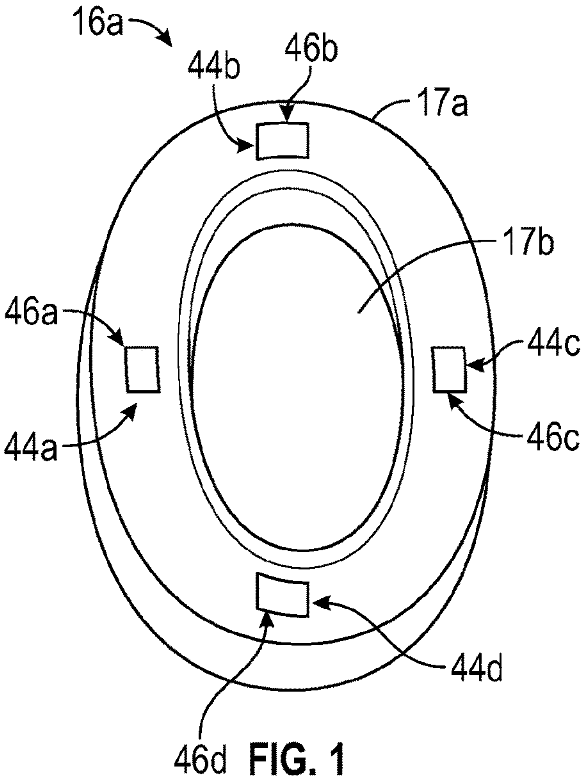
FIG. 1 is a schematic top view of a cushion of the hearing protection device according to an embodiment of the present disclosure showing haptic feedback elements.

FIG. 1 shows in a perspective schematic view the cushion 16*a* of hearing protector 10 according to an embodiment of the present disclosure before attachment to the earmuff 12 and the outer shell 14*a* thereof. Connection means 16*c*, 16*d* (not shown here, see FIG. 7) are used to connect the cushion 12*a* to the outer shell 14*a*. FIG. 1 further shows a ring-like material 17*a*, which is foreseen to contact the user's skin (not shown here) and a large oval opening 17*b* forming the cushion 16*a*, which is foreseen to house the user's ear (not shown here). As described above, the ring-like material 17*a* may comprise a porous or foamed material. In addition, FIG. 1 shows four haptic feedback elements 44*a-d* arranged at the cushion 16*a*, wherein two haptic feedback elements are arranged opposite to each other in a vertical orientation and two haptic feedback elements are arranged opposite to each other in a horizontal orientation. Each of the haptic feedback elements 44*a-d* comprise a skin-contacting element 46*a-d* which contact—in use—the user's skin (not shown here). The haptic feedback to the user 100 (not shown here) will be transmitted to the user's skin via the skin-contacting elements 46*a-d*.

Figure 2:
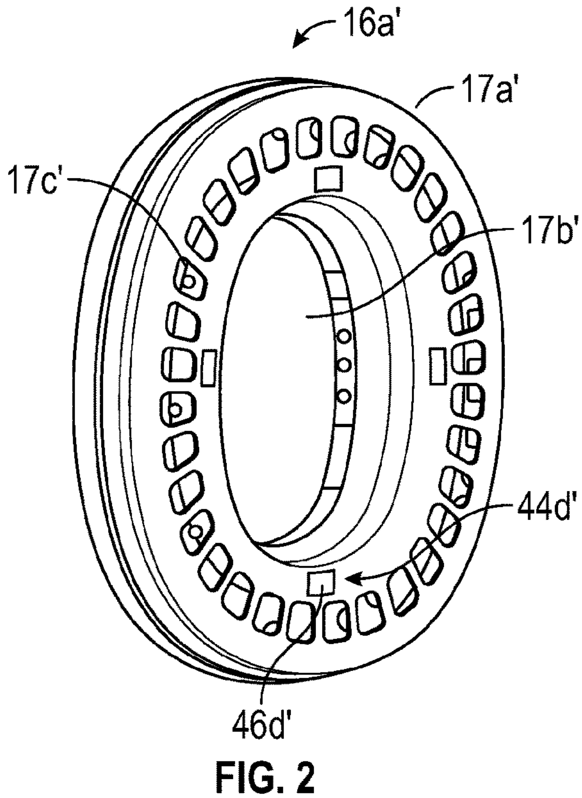
FIG. 2 is a schematic perspective view of a cushion of the hearing protection device according to another embodiment of the present disclosure showing haptic feedback elements.

FIG. 2 shows in a perspective schematic view the cushion 16*a*' of hearing protector 10 according to an embodiment of the present disclosure before attachment to the earmuff 12' and the outer shell 14*a*' thereof. The embodiment of FIG. 2 is similar compared to FIG. 1 except that the cushion 16*a*' is formed differently here. The cushion 16*a*' of FIG. 2 shows openings or passages 17*c*' therethrough to allow, for example, for access of a cushion sensor (not shown) embedded into the cushion 16*a*'. Connection means 16*c*, 16*d* (not shown here, see FIG. 7) are used to connect the cushion 16*a*' to the outer shell 14*a*. FIG. 1 further shows a ring-like material 17*a*', which is foreseen to contact the user's skin (not shown here) and a large oval opening 17*b*' forming the cushion 16*a*', which is foreseen to house the user's ear (not shown here). As described above, the ring-like material 17*a*' may comprise a porous or foamed material. In addition, FIG. 2 shows four haptic feedback elements 44*a*'-d' arranged at the cushion 16*a*', wherein two haptic feedback elements are arranged opposite to each other in a vertical orientation and two haptic feedback elements are arranged opposite to each other in a horizontal orientation. Each of the haptic feedback elements 44*a*'-d' comprise a skin-contacting element 46*a*'-d' which contact—in use—the user's skin (not shown here). The haptic feedback to the user 100 (not shown here) will be transmitted to the user's skin via the skin-contacting elements 46*a*'-d'.

Figure 3:
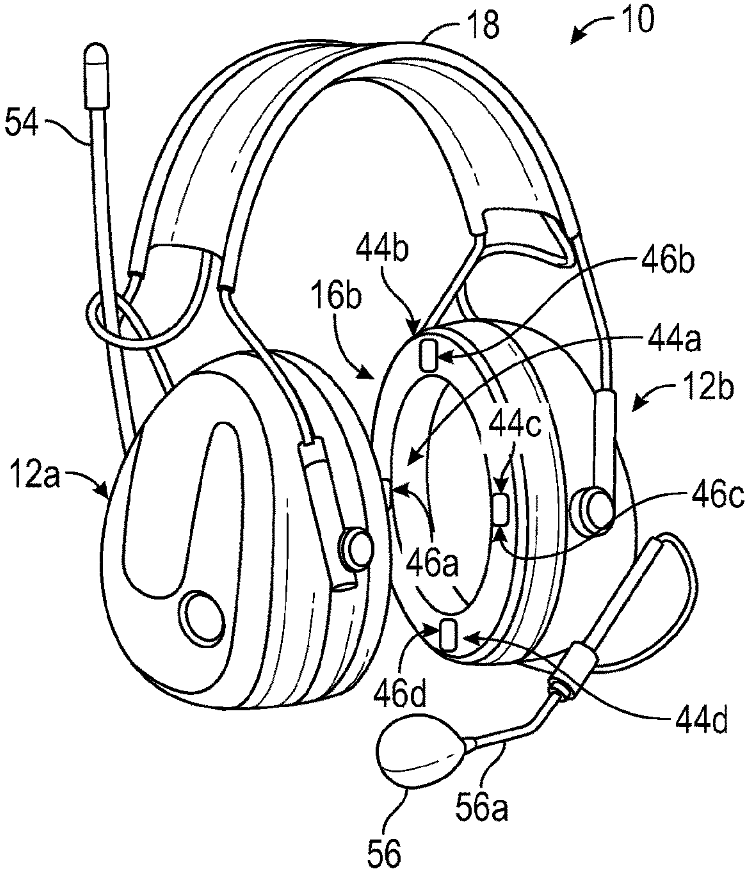
FIG. 3 is a schematic perspective view of a hearing protection device according to an embodiment of the present disclosure.

FIG. 3 shows in a schematic perspective view the hearing protection device 10 according to an embodiment of the present disclosure. The hearing protection device 10 comprises two earmuffs 12*a*, 12*b* supported by a headband 18 to which the earmuffs 12*a*, 12*b* each are connected to one end thereof. FIG. 3 further shows a microphone 56 mounted to one earmuff 12*b* of the hearing protection device 10 via the microphone boom 56*a*. Additionally, the hearing protection device 10 comprises an antenna 54 connected to one earmuff 12*a*. The antenna 54*a* is generally configured and arranged to transmit and/or receive wireless signals to and/or from other devices, e.g. other hearing protection devices or other external devices, e.g. sensors (not shown here). The antenna 54*a* may be part of an active communication unit (not shown here) and may be configured to wirelessly transmit and/or receive voice communication signals. Although the microphone 56 and the antenna 54*a* are mounted to different earmuffs 12*a*, 12*b*, it is understood that both may be mounted to one earmuff 12*a*, 12*b* only. In addition, FIG. 3 shows the cushion 16*b* having four haptic feedback elements 44*a-d* each with a skin-contact element 46*a-d*. As can be seen, two haptic feedback elements and skin-contact elements are arranged opposed to each other in horizontal orientation and in a vertical orientation. Although only shown for one of the earmuffs 12*a* here, it is understood that the other earmuff 12*b* may also comprise a plurality of haptic feedback elements and skin-contact elements, respectively.

Figure 4:
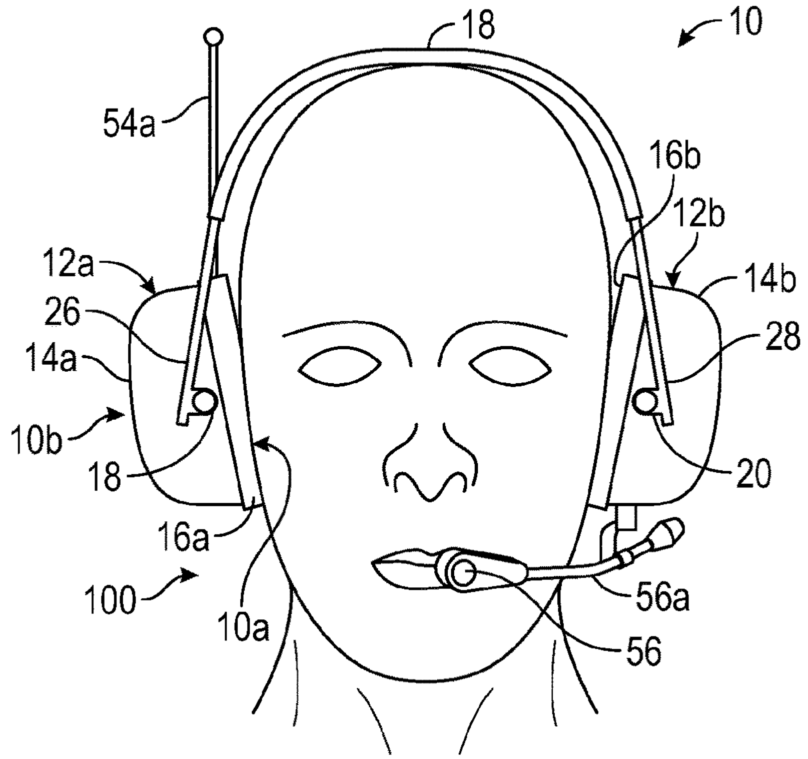
FIG. 4 is a schematic front view of the hearing protection device according to an embodiment of the present disclosure worn by a user.
Figure 7:
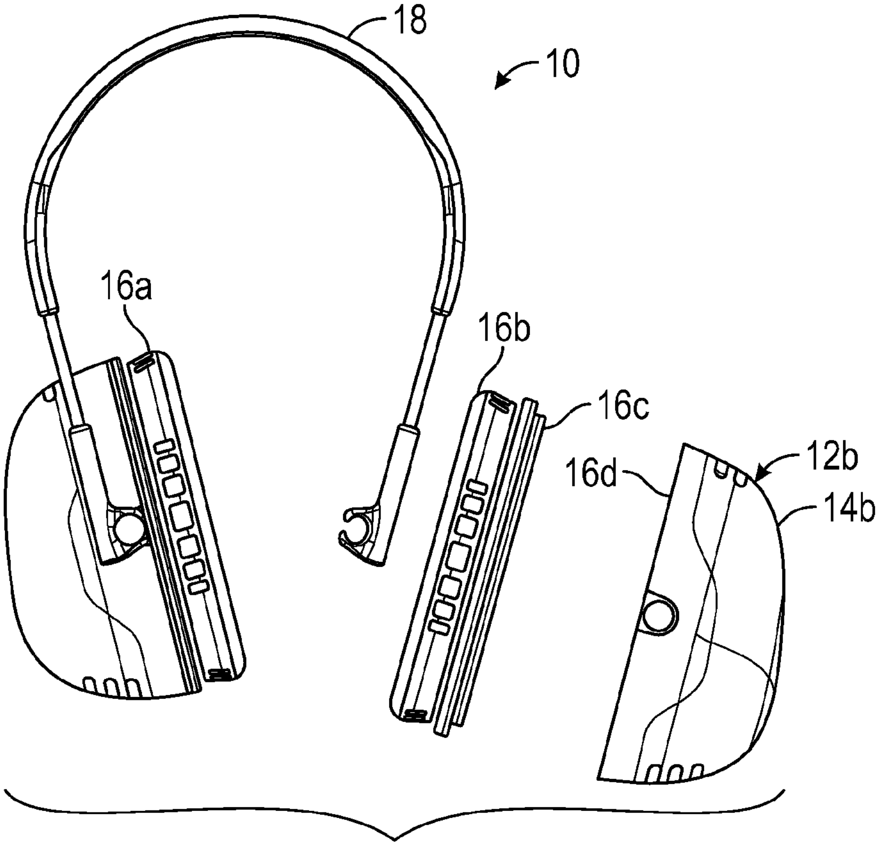
FIG. 7 is a schematic front view of a hearing protection device according to an embodiment of the present disclosure.

FIG. 4 shows in a schematic front view the hearing protector 10 according to an embodiment of the present disclosure worn by a user 100. The hearing protector 10 comprises the same functional components as illustrated above in FIG. 3. As can be seen from FIG. 4, the hearing protector 10 comprises two earmuffs 12*a*, 12*b* each having an outer shell or cup 14*a*, 14*b*. Attached to each of the earmuffs 12*a*, 12*b* are cushions 16*a*, 16*b* to contact the skin of the user 100 for providing a tight seal against the environment of the hearing protector 10, e.g. against ambient noise. More details of the cushions 16*a*, 16*b* can be seen from FIGS. 1 and 2. The connection between the cushions 16*a*, 16*b* and the outer shells or cups 14*a*, 14*b* may include connection means 16*c*, 16*d* (not shown here), which are illustrated in FIG. 7. Each of the earmuffs 12*a*, 12*b* is mounted to a headband 18 by earmuff mounts 18, 20 engaged with the headband extensions 26, 28, which keep the earmuffs 12*a*, 12*b* connected to the headband 18 in a pivoting relation to adapt to the user's skin thereby supporting the earmuffs 12*a*, 12*b*. The hearing protector 10 further comprises a microphone 56 mounted to one of the earmuffs 12*b* by a microphone boom 56*a*. Although not explicitly illustrated in FIG. 4, it is understood by the skilled person, that the earmuffs 12*a*, 12*b* may comprise loudspeakers (not shown) as part of an active communication unit present at the hearing protection device 10 for providing an audible indication to the user 100 wearing the hearing protection device 10. The microphone 56 enable the user 100 to send voice signals for communication to other users in the surrounding. Similar to FIG. 3, the hearing protection device 10 as shown here also comprises an antenna 54*a*. The antenna 54*a* is generally configured and arranged to transmit and/or to receive wireless signals to and/or from other devices, e.g. other hearing protection devices or other external devices, e.g. sensors (not shown here). The antenna 54*a* may be part of an active communication unit (not shown here) and may be configured to wirelessly transmit and/or receive voice communication signals. Although the microphone 56 and the antenna 54 are mounted to different earmuffs 12*a*, 12*b*, it is understood that both may be mounted to one earmuff 12*a*, 12*b* only. It is noted that the cushions 16*a*, 16*b* comprising haptic feedback elements 44*a-d* and the skin-contact elements 46*a-d* are not shown here (please see other FIGS. 1 to 3).

Figure 5:
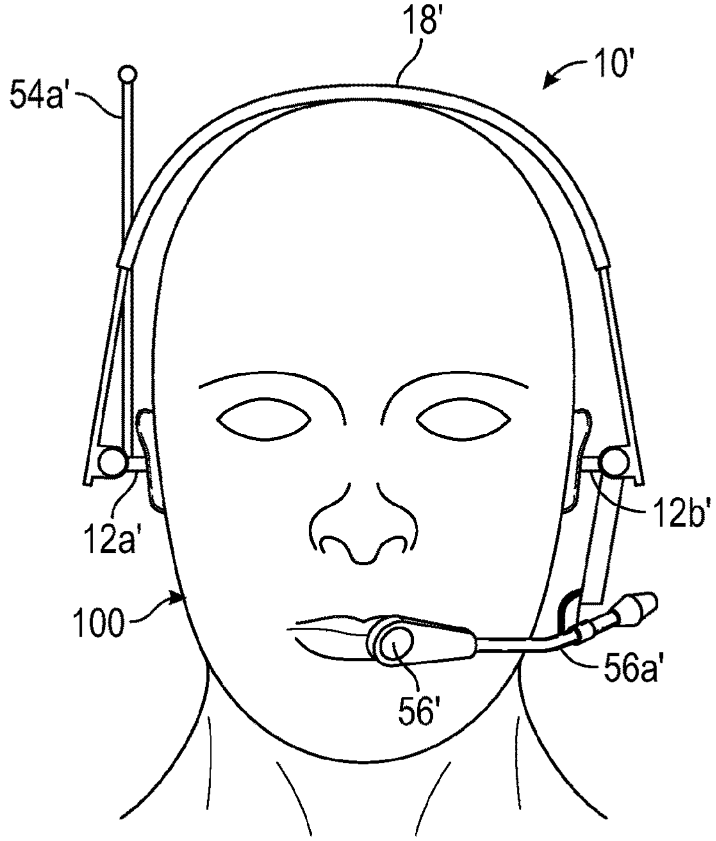
FIG. 5 is a schematic front view of the hearing protection device according to another embodiment of the present disclosure worn by a user.

FIG. 5 shows in a schematic front view a hearing protection device 10' according to another embodiment of the present disclosure. The hearing protection device 10' as shown here is similar to the hearing protection device 10 as illustrated in FIG. 1, except that the hearing protection device 10' comprises earplug 12*a*', 12*b*' instead of earmuffs 12*a*, 12*b* as illustrated in FIGS. 3 and 4. In the embodiment shown, the earplugs 12*a*', 12*b*' are each connected to a headband 18'. The earplugs 12*a*', 12*b*' may also comprise cushions at a side of the earplug facing—in use—towards the user's skin (not shown here). The connection between the earplugs 12*a*', 12*b*' is also not shown here, but may be similar to the connection of the cushions and the outer shell and the earmuffs 12*a*, 12*b*, respectively, of FIG. 4 and may comprise the connection means as shown in FIG. 7. The hearing protection device 10' further comprises a sensor unit 30'(not shown here) with the two sensors 32' and 34'. Similar to the embodiment of FIG. 1, the hearing protection device 10' also comprises an antenna 54*a*'. Moreover, the hearing protection device 10' comprises a microphone 56' mounted to the headband 18' by a microphone boom 56*a*'. Although not explicitly illustrated in FIG. 5, it is understood by the skilled person, that the earplugs 12*a*', 12*b*' may comprise loudspeakers (not shown) as part of an active communication unit present at the hearing protection device 10' for providing an audible indication to the user 100 wearing the hearing protection device 10'. Although the microphone 56' and the antenna 54*a*' are mounted to different earplugs 12*a*', 12*b*', it is understood that both may be mounted to one earplug 12*a*', 12*b*' only. It is noted that the cushions (not shown here) may comprise the haptic feedback elements 44*a*'-d' and the skin-contact elements 46*a*'-*d*' are not shown here (please see other FIGS. 1 to 3).

Figure 6:
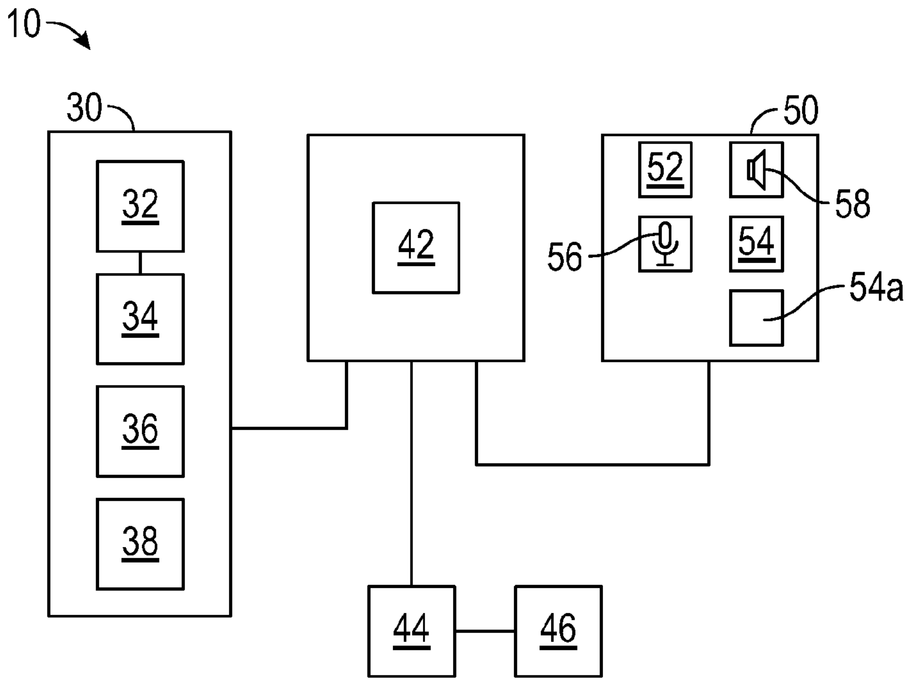
FIG. 6 is a schematic functional view of the hearing protection device according to an embodiment of the present disclosure.

FIG. 6 shows in a schematic functional view the hearing protector 10 according to an embodiment of the present disclosure comprising a sensor module 30 with four sensors 32, 34, 36, 38 and a control unit 42 for processing sensor data and/or for processing data externally received. As FIG. 6 is a functional illustration, some structural parts of the hearing protection device 10 as shown in FIGS. 3 and 4 are omitted here. The hearing protector 10 further comprises a haptic feedback element 44 which is also connected to the control unit 42. The haptic feedback element 44 further comprises a skin-contact element 46 (electrically) connected to the haptic feedback element 44. The skin-contact element 46 contacts the user's skin (not shown here) and transmits the haptic feedback signals thereto. Furthermore, in some embodiments, the hearing protector 10 may comprise an active communication unit 50 to enable the user (not shown here) of the hearing protector 10 to communicate with others in the surrounding without the need to take off the hearing protector 10 when communicating is needed. The active communication unit 50 further comprises a loudspeaker 58 for playing a sound to the user of the hearing protector 10 as well as a transmitter 52 and a receiver 54 for processing communication signals of the active communication unit 50. The active communication unit 50 comprises an antenna 54*a* for wirelessly transmitting and/or receiving communication signals to other users and/or devices (not shown here). Also, the active communication unit 50 is connected to the control unit 42, e.g. for transferring sensor data from the sensor module 30 to other devices or to transfer external data to the sensor module 30. The active communication unit 50 may also comprise a microphone 56 mounted to a microphone boom 56*a* (not shown here, please see FIG. 2).

FIG. 7 shows in a schematic front view an embodiment of the hearing protector 10 comprising two earmuffs 12*a*, 12*b* supported by a headband 18 to which the earmuffs 12*a*, 12*b* each are connected on one end thereof. In FIG. 7, one of the earmuffs 12*b* has been disconnected from one end of the headband 18 and additionally, the cushion 16*b* has been disconnected from the outer shell or cup 14*b* of the earmuff 12*b*. The other earmuff 12*a* of the hearing protection device 10 is shown in a configuration having the cushion 16*a* attached to the outer shell or cup 14*a* of the earmuff 12*a* and having the earmuff 12*a* attached to one end of the headband 18. In the detached configuration as illustrated in FIG. 7, it can be seen that the cushion 16*b* as well as the outer shell or cup 14*b* comprise connection means 16*c*, 16*d*. The connection means 16*c* is arranged at the cushion 16*b* and the connection means 16*d* is arranged at the outer shell or cup 14*b* of the earmuffs 12*b*. For mounting the cushion 16*b* to the outer shell or cup 14*b*, the connection means 16*c*, 16*d* are brought into contact with each other such that these engage with each other. The connection means 16*c*, 16*d* may comprise suitable structure to provide reliable engagement, e.g. threaded portions, bayonet portions or any other suitable fastening structure. It is also conceivable to arrange adhesive fastening means at the connection means 16*c*, 16*d* such that an adhesive connection is established between the cushion 16*b* and the outer shell or cup 14*b* of the earmuff 12*b*. It is noted that the hearing protection device 10 in FIG. 7 comprises—although not shown here—other features, which are shown in previous FIGS., in particular in FIGS. 1, 2, 4 and 6.

Figure 8:
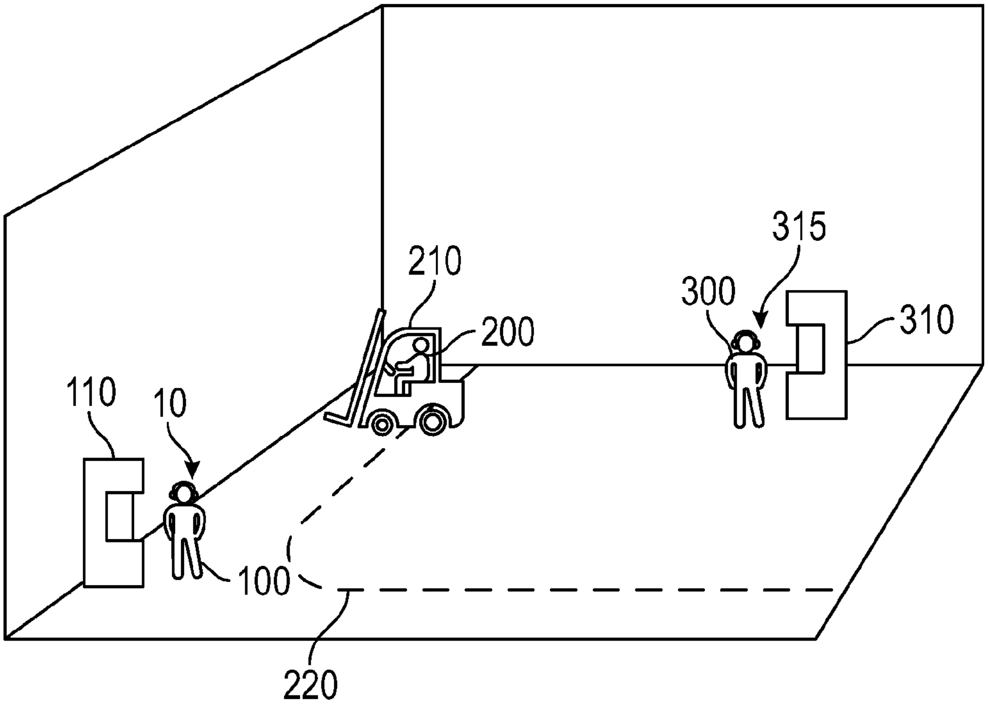
FIG. 8 is a schematic perspective view of a work environment including a user of a hearing protection device according to an embodiment of the present disclosure and a vehicle with a driver and a machine with a worker surrounding the hearing protection device and FIG. 9 is a schematic perspective view of a part of a hearing protection device according to an embodiment of the present disclosure.

FIG. 8 shows in a perspective view the users 100, 200, 300 wearing a hearing protection device 10 according to an embodiment of the present disclosure. The user 100 is working at a machine 110. A second user 200 is driving a vehicle 210, e.g. a forklift 210, representing an object moving in the surrounding of the first user 100. The vehicle 200 may move along the pathway which is indicated by dotted line referenced with 220. Information about such a moving object in the surrounding of the user 100 and feedback to the user 100 about this is considered as ambience-specific feedback to the user 100 provided by the hearing protection device 10. For example, a proximity detector present in the hearing protection device 10 may detect the vehicle 210 in the surrounding of the user 100 and generate a signal sent to the control unit for initiating haptic feedback to the user 100 about the presence of the vehicle 210. Alternatively, communication and information exchange between the vehicle 210 and the hearing protection device 10 may occur, e.g. a signal is sent to the control unit of the hearing protection device 10 about the presence of the vehicle 210 so that the control unit initiates haptic feedback to the user 100 about the presence of the vehicle 210. The hearing protection device 10 gives—in parallel and in addition to the ambience-specific feedback—at the same time also device-specific feedback to the user 100, e.g. conditions of the hearing protection device such as battery status, alert about an incoming call or the like. The third user 300 is also working at a machine 310. With regard to getting feedback, the same may hold true for the second and third user 200, 300 as it is described above for the user 100. Also, a movement of the third user 300 away from machine 310 and, e.g. coming closer to user 100, may also trigger feedback to the user 100 in a similar way as outlined above for the vehicle 200 coming closer to the user 100. In a way, user 300 moving closer to the user 100 may also be considered as an object moving in the surrounding of the user 100 and may trigger similarly ambience-specific feedback to the user 100 (in parallel and in addition to device-specific feedback the user 300 may receive from the hearing protection device 315 worn by the user 300) as mentioned above for the vehicle 210.

Figure 9:
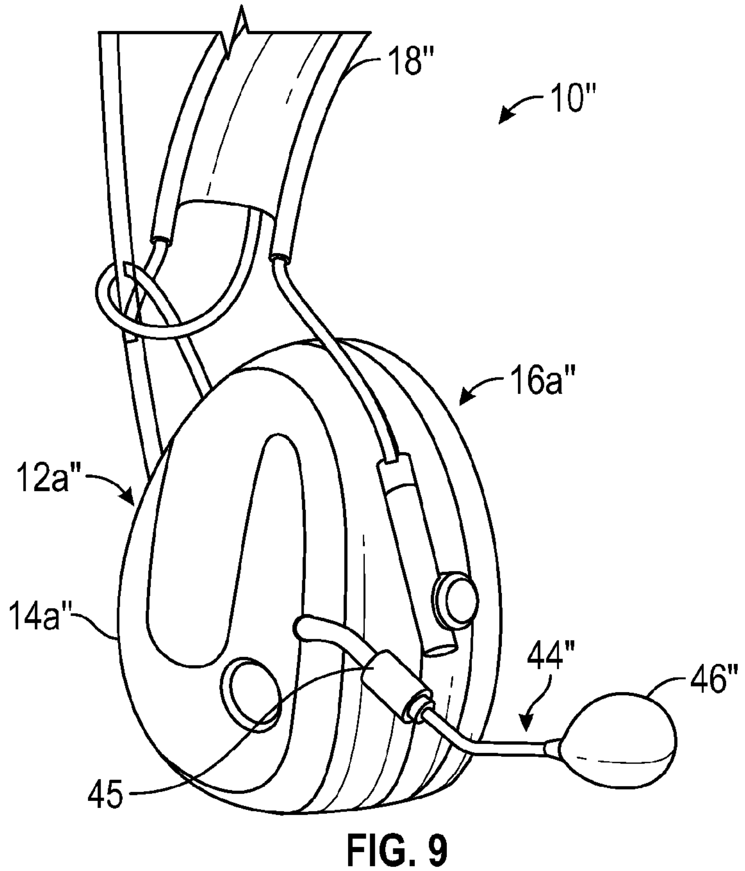

FIG. 9 shows in a schematic perspective view of a part of a hearing protection device 10" according to an embodiment of the present disclosure. The earmuff 12" is mounted to a headband 18" (only partially shown here) and comprises a cushion 16*a*"on a side facing—in use—towards the user's skin. On the opposite side thereof, i.e. facing—in use—away from the user's skin, the outer shell 14*a*" is shown at which the earmuff 12*a*"is attached to the headband. A boom 45 extends from the outer shell 14*a*" as part of the haptic feedback element 44" carrying the skin-contact element 46" which—in use—touches the user's skin. It is noted that the hearing protection device 10" is similar to the hearing protection device 10 as shown and described in FIGS. 3 and 4 except that the arrangement of the haptic feedback element 44" and of the skin-contact element 46" is different compared to the embodiment of FIGS. 3 and 4, where the haptic feedback elements 44*a-d* and the skin-contact elements 46*a-d* are arranged at the cushion 16*b* and where there is no haptic feedback element extending from the outer shell of the earmuff.

The invention claimed is:

1. A hearing protection device comprising at least one earmuff or earplug, a headband for supporting the earmuff or the earplug at a user's head, the at least one earmuff or earplug comprising a sound-absorbing material, a control unit, at least one haptic feedback element comprising a skin-contact element, wherein the haptic feedback element is configured and arranged to provide device-specific feedback and ambience-specific feedback to the user and wherein the skin-contact element is configured and arranged to transmit—in use-haptic signals to the user's skin.

2. The hearing protection device according to claim 1, wherein the at least one earmuff or earplug comprises a cushion at a side facing—in use-towards the user's skin and an outer shell at a side facing—in use-away from the user's skin.

3. The hearing protection device according to claim 2, wherein the skin-contact element is arranged at the cushion.

4. The hearing protection device according to claim 2, where in the skin contact element extends from the at least one earmuff or earplug, preferably from the outer shell.

5. The hearing protection device according to claim 1, wherein the device-specific feedback includes conditions of the hearing protection device and/or of the user comprising motion, orientation, skin temperature of a user, skin resistance of a user, battery capacity, operational capability of the hearing protection device.

6. The hearing protection device according to claim 1, wherein the ambience-specific feedback includes ambient temperature, ambient pressure, a warning or indication about objects moving around the user and/or specific situations in the surrounding of the user.

7. The hearing protection device of claim 6, wherein the ambience-specific feedback includes information or signals from a remote device, preferably comprising a sensor.

8. The hearing protection device according to claim 1, wherein the control unit is configured to switch parameters at the hearing protection device and to detect conditions of the hearing protection device and/or of the user.

9. The hearing protection device according to claim 1, wherein the control unit is configured to send a control signal to the at least one haptic feedback element.

10. The hearing protection device according to claim 1, wherein the at least one haptic feedback element is configured and arranged to receive a control signal from the control unit to provide haptic signals to the user.

11. The hearing protection device according to claim 1, wherein the control unit comprises at least one sensor to detect environmental and/or physiological conditions, preferably an accelerometer, a temperature sensor, a humidity sensor, an acoustic sensor and/or pressure sensor.

12. The hearing protection device according to claim 1, wherein the haptic feedback element comprises a vibration device and wherein the haptic signal includes vibration.

13. The hearing protection device according to claim 1, wherein the at least one earmuff or earplug comprises a plurality of haptic feedback elements configured and arranged at the at least one earmuff or earplug such that localization information about a moving object is provided to the user.

14. A method of operating a hearing protection device, the hearing protection device comprising at least one earmuff or earplug, a headband for supporting the earmuff or earplug at a user's head, the at least one earmuff or earplug comprising sound-absorbing material, a control unit, at least one haptic feedback element comprising a skin-contact element, wherein the haptic feedback element is configured and arranged to provide device-specific feedback and ambience-specific feedback to the user and wherein the skin-contact element is configured and arranged to transmit, while in use, a haptic signal to the user's skin, the method comprising the steps of:

detecting conditions of the hearing protection device and/or of the user, detecting conditions of the ambience of the hearing protection device, processing the detected conditions and forming device-specific feedback and ambience-specific feedback signals, and providing device-specific feedback and ambience-specific feedback to the user of the hearing protection device by transmitting haptic signals to the user's skin.

15. The method according to claim 14, wherein the device-specific feedback includes conditions of the hearing protection device and/or of the user comprising motion, orientation, skin temperature of a user, skin resistance of a user, battery capacity and/or operational capability of the hearing protection device.

16. The method according to claim 14, wherein the ambience-specific feedback includes ambient temperature, ambient pressure, a warning or indication about objects moving around the user and/or specific situations in the surrounding of the user and wherein the ambience-specific feedback includes information or signals from a remote device, preferably comprising a sensor.

* * * * *